United States Patent [19]

Adams et al.

[11] Patent Number: 5,435,943

[45] Date of Patent: Jul. 25, 1995

[54] METHOD AND APPARATUS FOR MAKING AN OPHTHALMIC LENS

[75] Inventors: Jonathan P. Adams; John B. Enns, both of Jacksonville, Fla.

[73] Assignee: Johnson & Johnson Vision Products, Inc., Jacksonville, Fla.

[21] Appl. No.: 212,624

[22] Filed: Mar. 11, 1994

[51] Int. Cl.$^6$ .................................................. B29D 11/00
[52] U.S. Cl. ................................... 2641/1.1; 264/85; 264/102; 264/37; 264/DIG. 78; 425/73; 425/74; 425/215; 425/447; 425/808
[58] Field of Search ................ 264/1.1, 1.7, 101, 102, 264/85, 571, 297.8, 310, 311, DIG. 78, 37; 425/73, 74, 136, 215, 447, 449, 808

[56] References Cited

U.S. PATENT DOCUMENTS

| | | | |
|---|---|---|---|
| 2,542,386 | 2/1951 | Beattie . | |
| 3,551,541 | 12/1970 | Rossetti | 264/102 |
| 3,621,892 | 11/1971 | Gillespie | 264/102 |
| 3,894,024 | 7/1975 | Cherenko et al. | 264/349 |
| 4,234,533 | 11/1980 | Longlands | 264/1.7 |
| 4,386,039 | 5/1983 | Szycher | 264/1.1 |
| 5,222,118 | 6/1993 | Gerth . | |

Primary Examiner—Mathieu D. Vargot

[57] ABSTRACT

A method and apparatus for making an ophthalmic lens pumps monomer into one end of a gas permeable tube along its interior length while a chamber surrounding the gas permeable tube is maintained at a subatmospheric pressure by means of a vacuum pump. Preferably, the gas permeable tube is made of silicon rubber. Static mixers introduce mixing into the flow of the monomer within the tube in order to expose the bulk of the monomer to the gas permeable walls of the tube. Under such conditions in the gas permeable tube, the majority of the dissolved gasses are removed from the monomer and continue to be drawn out of the chamber by the pump connected to the chamber. The degassed monomer is then transferred into a mold where it is polymerized into an ophthalmic lens.

10 Claims, 5 Drawing Sheets

METHOD AND APPARATUS FOR MAKING AN OPHTHALMIC LENS

BACKGROUND OF THE INVENTION

This invention relates to an improved method and apparatus for making ophthalmic lenses. In particular, this invention is suited to molded ophthalmic lenses such as hydrogel contact lenses, although the method is also suitable for other small, high-precision ophthalmic lenses such as intraocular lenses and other methods of manufacturing such as by spin casting.

Soft ophthalmic lenses for placement on the cornea or within the eye, such as contact lenses or soft intraocular lenses, can be made by a variety of techniques. Ophthalmic lenses can be made by spin casting a monomer material in a rotating mold then polymerizing the material so shaped. Another method used to manufacture both contact lenses and intraocular lenses is precision lathing of a piece of material which is then polished and used as a lens.

Recently the molding of soft contact lenses and soft intraocular lenses has come into favor. This technique has the advantages of repeatability and speed that compares favorably with the prior methods of manufacturing lenses. Techniques for successfully molding hydrogel lenses can be found in U.S. Pat. Nos. 4,495,313 and 4,640,489 to Larsen and 4,889,664; 4,680,336 and 5,039,459 to Larsen et.al. These patents specifically described the use of acceptable monomers, a diluent which substitutes for water during the molding process and is replaced with water after the molding has been completed. The advantage of this technique is that the optical properties, size and shape of the lens thus made does not change as radically as with methods that do not utilize such diluent.

It is further known in the art to mold such ophthalmic lenses by forming a monomer or monomer mixture in a mold such as one made from polystyrene or polypropylene. An example of this art can be found in U.S. Pat. No. 4,565,348 to Larsen wherein the requirement for a polystyrene mold materials, chemistry and processes are discussed. In contrast to the above polystyrene molds, another example is the use of polypropylene or polyethylene molds such as that described in U.S. Pat. No. 4,121,896 to Shepherd.

A particular problem, however, is that the monomer or monomer mixture usually contains dissolved gases from the air ($O_2$ and $N_2$) that may cause at a minimum bubbles from inert gas, or interfere with polymerization if the gas is reactive with free radicals available during polymerization.

It has been recognized that in the manufacture of ophthalmic lens, particularly contact lenses, it is desirable to eliminate oxygen from the monomer mix, because oxygen interferes with the polymerization reaction. This is found to still be true with the production of molded contact lenses using a diluent. One practice is to degas the monomer or monomer mixture placing the monomer mixture into a rotary evaporator unit (such as the Rotovap available from Buchi Rotavapor, Inc. of Flawil, Switzerland; sold by Fisher Scientific of Springfield, N.J.) to remove excess gas. This procedure for instance, is applicable to the monomer mixtures described in U.S. Pat. Nos. 4,889,664 and 4,495,313 where the mixture is rotated under subatmospheric pressure. The container with a monomer mixture is then flushed with nitrogen and held under a nitrogen atmosphere until it is used.

This is done in a round flask half filled with monomer. The Rotovap unit spins the monomer to increase the surface and the reduction in gas is proportional to the ratio of the lower pressure to atmospheric pressure, that is, 760 mm Hg.

The overall gas content is reduced to the above ratio, but the $N_2$ to $O_2$ ration remains the same as in air.

Because the container is then back filled with $N_2$ nitrogen gas has an opportunity to redissolve in the monomer mixture. The end result of the process is then actually an $O_2$ removal process. While this procedure solves the problem of $O_2$ reaction with the monomer and polymerization process, it does not eliminate problems associated with dissolved nitrogen which may cause bubbles to form during polymerization. In addition, once the monomer is reduced in oxygen content, exposure to the oxygen in the air during subsequent handling can cause $O_2$ reabsorption.

In addition, at the low pressures (less than 40 mm Hg) volatile components of the monomer mixture may evaporate changing the composition of the monomer.

Finally, there are additional handling and manufacturing problems associated with maintaining a nitrogen environment around the gas-reduced monomer mixture produced in a batch process.

It is, therefore, an object of the present invention to greatly reduce the amount of dissolved oxygen in the monomer mixture used to produce ophthalmic lenses.

It is a further object of the invention to reduce the amount of dissolved nitrogen in the monomer mixture used for ophthalmic lens production.

It is a further object of the invention to reduce or eliminate the need for handling $N_2$ gas during monomer processing and handling.

Another object of the invention is to minimize the evaporation of volatile components from the monomer mixture during dissolved gas removal.

Finally, it is an object of the invention to minimize the exposure of the degassed monomer mixture to atmospheric conditions, particularly oxygen, before being used to produce an ophthalmic lens. Additionally, it is desired to eliminate the need to perform a degassing operation on a batch basis in order that the degassed monomer is used as it is available further reducing handling and oxygen exposure time.

SUMMARY OF THE INVENTION

The above objectives are achieved by a method and apparatus that takes monomer as received, pumps the monomer from the container in which it is received, into one end of a gas permeable tube through and along its interior length. A chamber surrounding the gas permeable tube is maintained at a subatmospheric pressure by means of a vacuum pump connected to the chamber for drawing and maintaining the subatmospheric pressure. Under such conditions in the gas permeable tube, the majority of the dissolved gasses within the monomer are removed from the monomer and continue to be drawn out of the chamber by the pump connected to the chamber.

After completing travel through the gas permeable tubing within the chamber, the monomer exits the opposite end of the gas permeable tube where it is then transferred into a lens mold, polymerized into an ophthalmic lens within the lens mold, then removed from the mold.

In the preferred practice of the invention, the apparatus includes a means for introducing mixing into the flow of the monomer within the tube in order to expose the bulk of the monomer to the gas permeable walls of the tube.

Excess monomer that is processed within the chamber and exiting the gas permeable tube, but not needed for lens molding when it is processed, is returned to the original container from which it is drawn and is later reprocessed through the degassing system.

Preferably, the gas permeable tube is made of silicon rubber. The method preferably includes the step of maintaining an inert gas environment around the monomer removed from the gas permeable tube until the monomer is polymerized into an ophthalmic lens.

DETAILED DESCRIPTION OF THE PREFERRED EMBODIMENT

Figure 1:
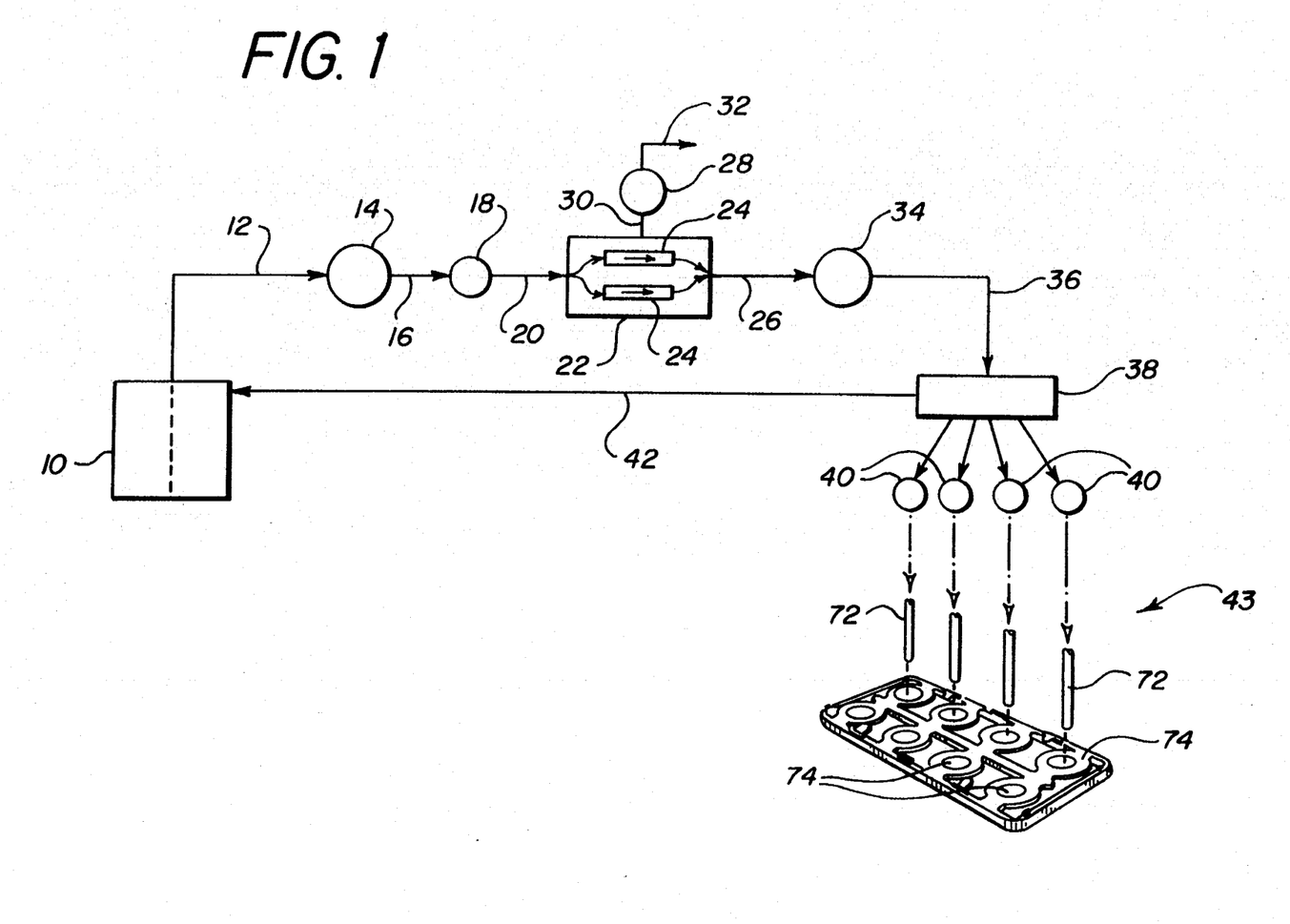
FIG. 1 is a simplified flow chart showing the various components of the monomer degassing and lens production system.
Figure 2:
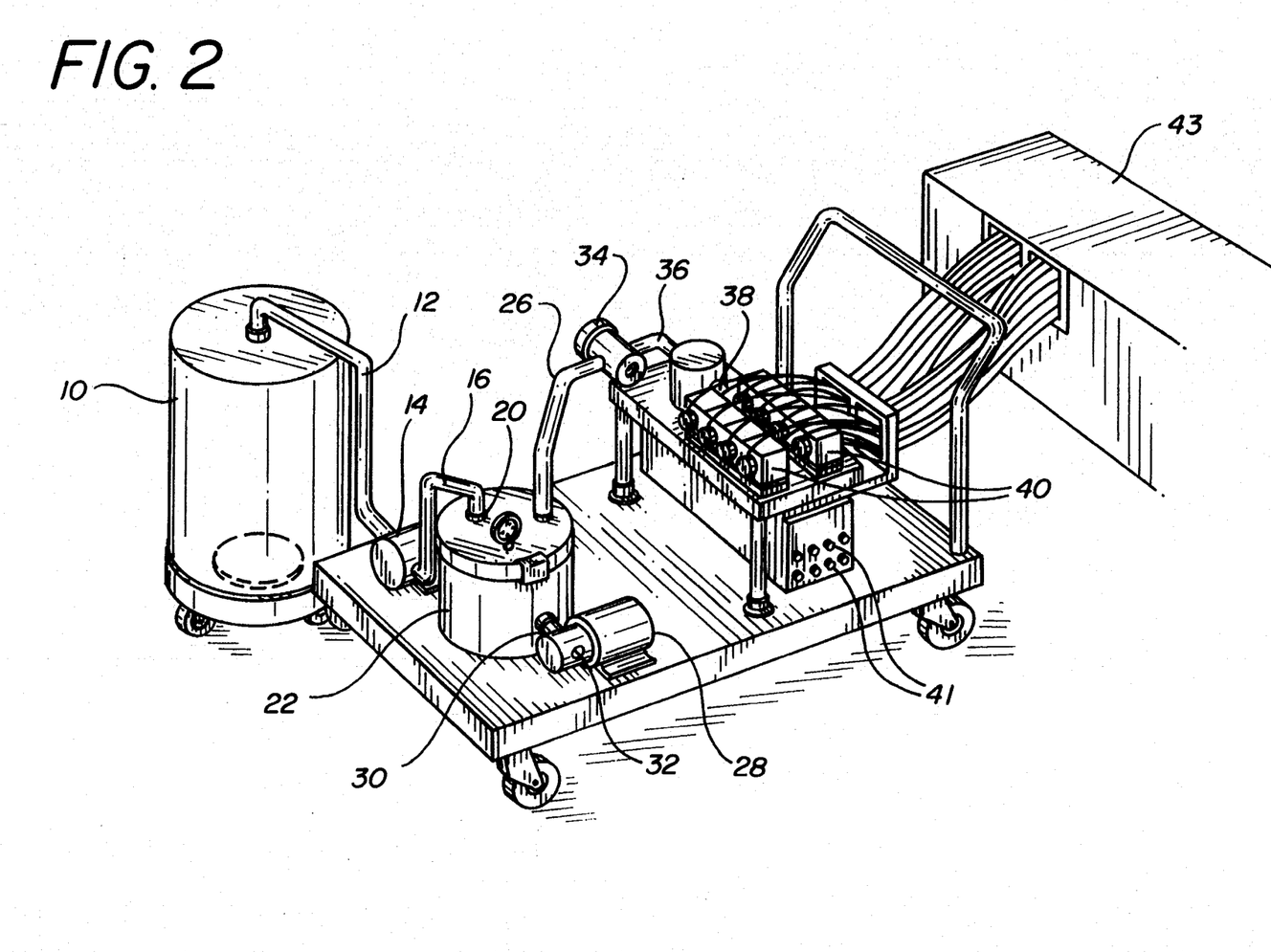
FIG. 2 is a perspective view of the physical equipment shown in the degassing flowchart of FIG. 1.

Referring now to FIGS. 1 and 2 showing the preferred embodiment of the present invention in flowchart and physical form, respectively, monomer is provided in a container 10, typically 15 liters in volume. The container is connected to the monomer degassing system by means of a line 12. Suction is developed by pump 14 to draw the monomer from the drum 10, through line 12, by pump 14, and out the pump discharge 16.

Unless otherwise specified herein, the lines used for monomer flow through the system can be fashioned of any gas impermeable material with which the monomer is chemically non-reactive.

While going through discharge line 16, monomer passes through filter 18 in order to remove extraneous particulate contaminates that may be present in the monomer.

Monomer is then provided to the inlet 20 of the degas unit 22. Within the degas unit, monomer is divided among a plurality of tubes 24, and then recombined into a degas unit discharge 26. The degas unit is operated under a low ambient pressure typically around four torr which is provided by vacuum pump 28. This vacuum pump is attached to the degas unit 22 by line 30 and discharges the excess air from the degas unit by way of line 32.

After the monomer exits degas unit 22 by discharge line 26, it passes through an oxygen monitor 34. This monitor measures the residual oxygen within the monomer to insure that the degas unit is functioning properly. If the oxygen content of the monomer is indicated as being too high, operation of the ophthalmic lens production line can be halted until the problem is corrected in order to avoid production of defective lenses.

Once oxygen monitor 34 has determined that the oxygen content of the monomer is sufficiently low, monomer passes through line 36 into manifold 38. The manifold is used as a common source to supply a plurality of precision dose pumps 40 regulated by pump controllers 41 and used to fill individual contact lens molds at the monomer dosing station 43. The pumps 40 used to pump processed monomer delivered to manifold 38 are IVEK pumps made by the Motor and Control Division of Pacific Science, Rockford, Ill. These pumps provide precision doses of degassed monomer to mold cavities 74 via nozzles 72.

The excess degas monomer which is processed by the system travels along return line 42 to the monomer drum 10. In addition to assuring that sufficient monomer is processed to supply the filling machines used to produce the lenses, this return line 42 allows the monomer degassing system to continue to operate if the filling machines are temporarily shut down for any reason. In this way, there is no need to shut down the monomer degassing system if the remainder of the lens production system is inoperative.

Figure 3:
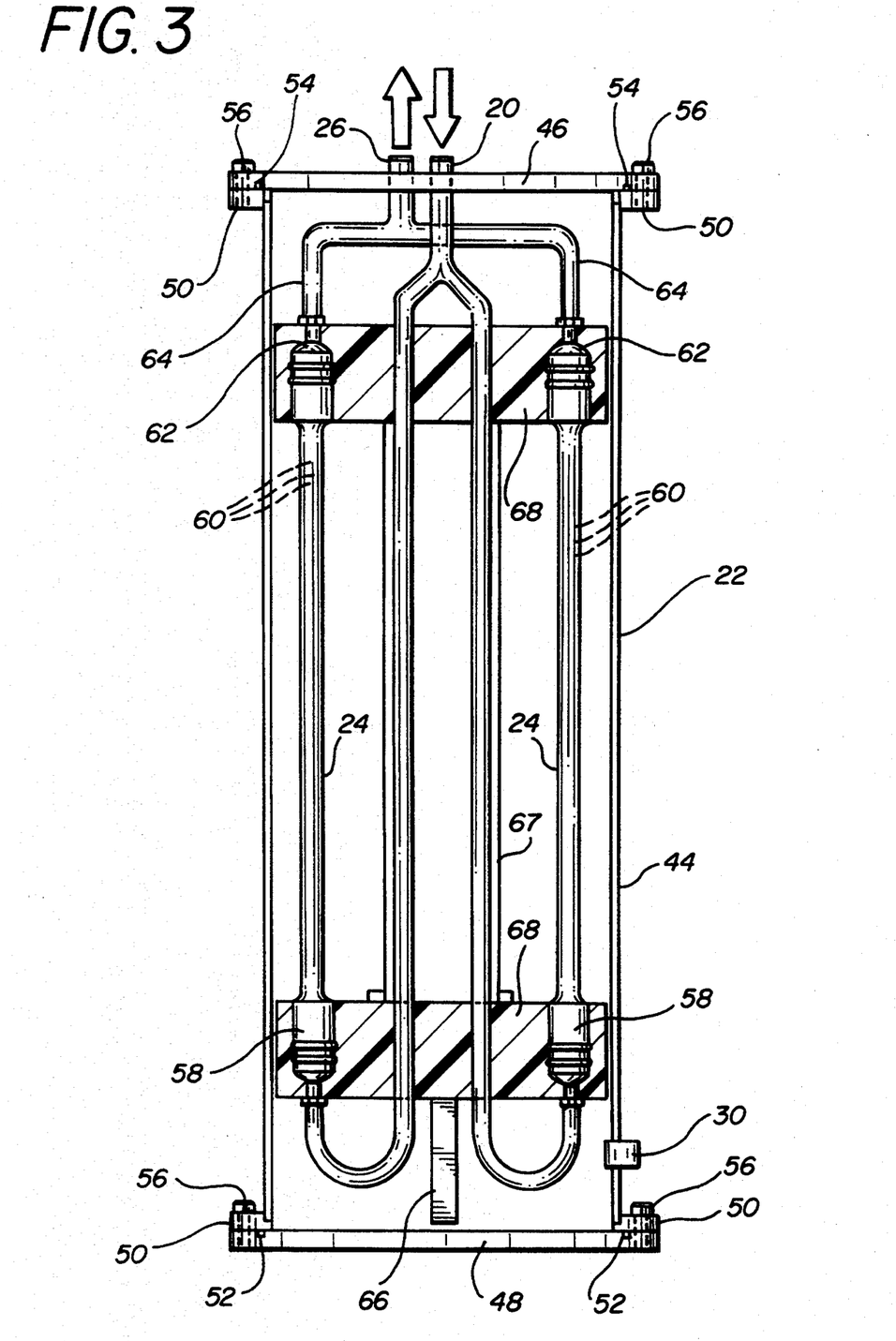
FIG. 3 is a detailed planar view showing in section the degas unit comprising a portion of the degassing system.

Turning now to FIG. 3, there is shown in greater detail the monomer degassing unit 22. The degassing unit is shown to be comprised of a pressure boundary consisting of an outer cylindrical wall 44, a top plate 46 and a bottom plate 48. Contained within the cylindrical side wall 44 is a port 30, which is connected to vacuum pump 28 (not shown).

Top plate 46 and bottom plate 48 are attached to the cylindrical side walls 44 by use of flanges 50 compressed upon O-rings 52 and 54 found on the bottom and top plates, respectively. Compression of the O-rings and attachments of plates 46 and 48 to flanges 50 is accomplished by bolts 56 that attach the plates to the flanges.

Passing through top plate 46 is the monomer inlet line 20. This inlet line passes through the top plate 46, divides within the chamber 22 by means of a "Y" connector into two lines 57 of equal length. Lines 57 are preferably of equal length in order to provide equal back pressure resulting in equal of monomer flow through both lines to two separate headers 58. Each of these headers is connected to ten silicon tubes 60 which are permeable to oxygen. The tubes 60 are arranged in a 3-4- 3 offset array, 0.300 spacing center-to-center. The flow through the tubes is from the bottom up in order to fill the tubes and not entrain voids in the liquid.

The internal structure of the degas unit stands off the bottom of chamber 22 by stainless steel pipe 66. Stainless steel pipe 67 supports Delrin blocks 68 at the desired separation and these blocks, in turn, support manifolds 58 and 62 containing therebetween extended gas permeable tubes 60.

During its time of residence in the silicon tube 60 in the low pressure degas chamber 44, oxygen and nitrogen migrate out of the monomer through tube wall 60, drawn out by the vacuum pump through chamber outlet 30. As the monomer approaches the top of the chamber it is essentially free of dissolved gasses.

The silicon tubes near the top of the chamber are connected to second headers 62 which combine silicon tubes 60 back into common tubes 64. These tubes are made of an impervious material and are of the same length in order to avoid pressure differences which could result in flow imbalances. Tubes 64 are then connected in a "Y" fashion to provide a single degas unit outlet 26. The monomer then continues as described by reference to FIGS. 1 and 2.

Figure 4:
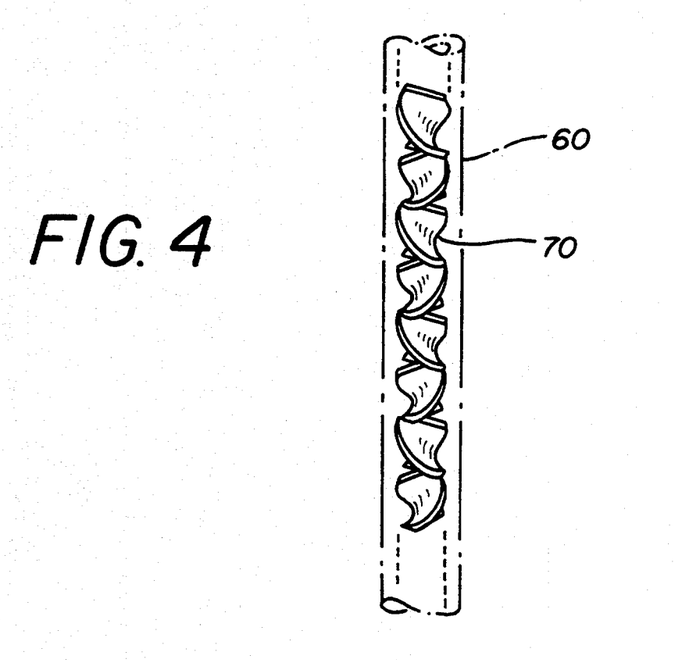
FIG. 4 shows in detail one of the individual gas permeable tubes shown in the degassing unit of FIG. 2 and including within the tube a static flow mixer tube.

Turning now to FIG. 4, there is shown in detail a section of gas permeable tube 60. Contained within this gas permeable tube is static flow mixer 70.

Without such a flow mixer 70, the amount of monomer exposed to the inner tube surface of the gas permeable tube 60 would be greatly lessened. Although the flow of the monomer through the tube without the static mixer would not be plug flow, that is, with no mixing at all, a realistic expectation would be that laminar flow would occur. There would be some mixing, but a boundary layer would form along the inner surface of the tube wall. The introduction of the static flow mixer 70 breaks up the boundary layer and causes turbulent flow over the entire cross section of the flow along the entire length of the tube.

The type of gas permeable tubing used must be selected with care. The use of a blood oxygenator tubing made of porous polypropylene in reverse (to remove gas rather than supply it) was attempted and found to be adequate in reducing the oxygen content of the monomer, but had the draw back of allowing monomer to leach through the polypropylene tubing. A solid membrane is needed to prevent leaching of the monomer.

Another blood oxygenation material, a silicon membrane, was employed and found to be both permeable to oxygen and nitrogen while not allowing monomer to leach through the tubing wall. It was found, however, that a color additive to the silicon membrane leached into the monomer during processing.

For this reason, the preferred material for the gas permeable tubing is STHT tubing produced by Sanitech Inc. of Andover, N.J. from Q74780 medical grade silicone rubber manufactured by Dow Corning of Midland, Mich. This silicon tubing does not contain an additive that can be taken into the monomer.

The apparatus is arranged so that each set of tubes 24 contains ten tubes, each $\frac{1}{4}$ inch inner diameter with a wall thickness of 1/32 inch. Tubing originally employed having a 60 durometer hardness was found to have inadequate resistance to back pressure of the monomer being pumped. The walls of the tubing would expand and circumvent the function of the static mixers. In addition, under operating vacuum conditions, the monomer pressure would expand and subsequently rupture the tube.

The use of 80 durometer silicon tubing was found to eliminate the above problems.

The apparatus then ultimately consists of two sets of ten tubes three feet long, each of the tubes containing static mixers. These static mixers are made of Delrin, $\frac{1}{4}$ inch in diameter and 6 inches long, produced by KO-FLO, Inc. of Carrie, Ill.

In operation, monomer flows into the degas unit with an oxygen concentration of 17 parts per million and exits the chamber at 0.6 parts per million. The preferred vacuum level in the chamber (outside the tubing) is between 2 and 5 torr.

Figure 5:
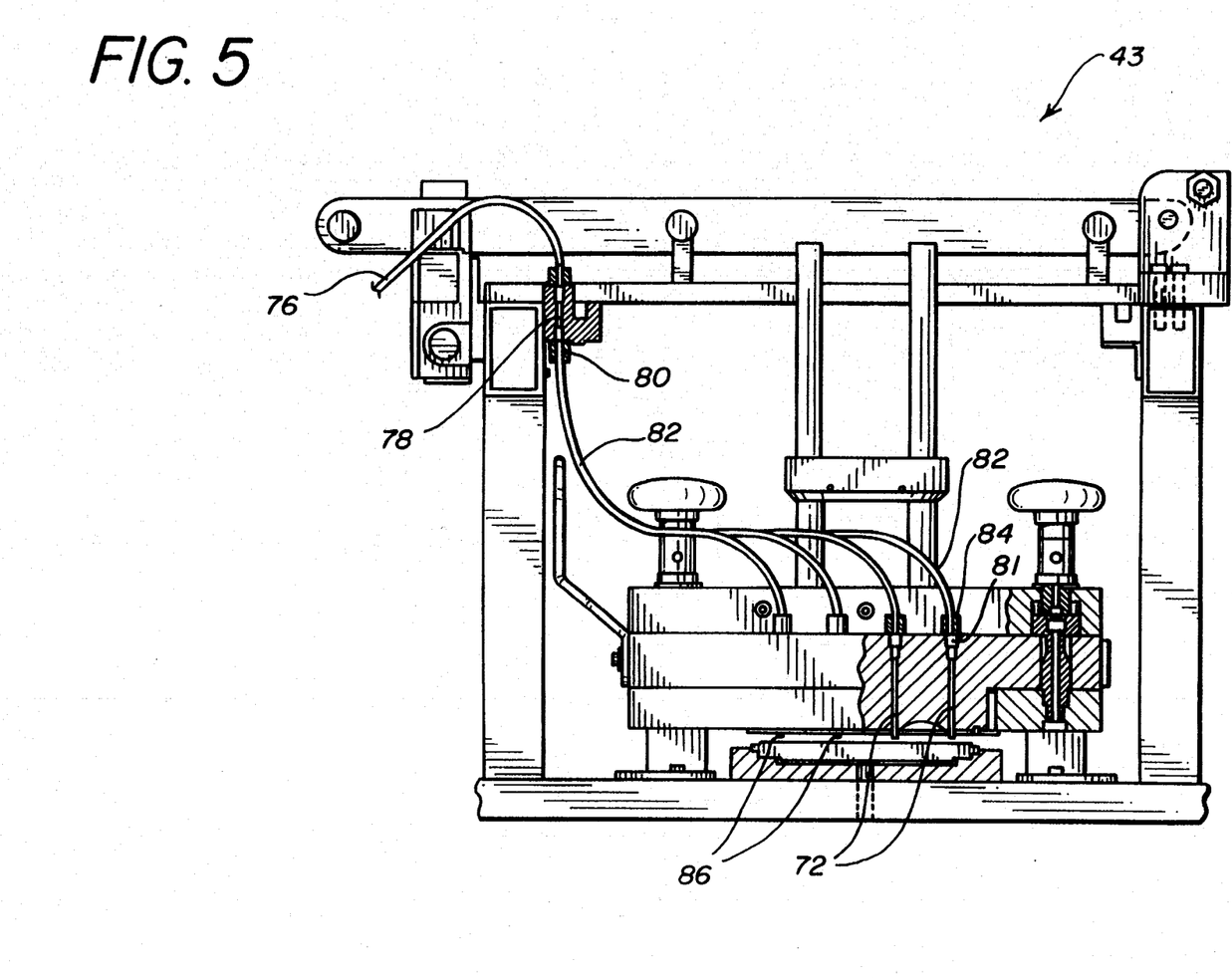
FIG. 5 is a planar view, partially in section, of the monomer dosing portion of the subject system.

Referring now to FIG. 5, there is shown in greater detail monomer dosing station 43. Leading into the station from precision dose pumps 40 (not shown) is $\frac{1}{8}$ inch outer diameter tube 76 meeting the above established criteria of gas impermeability and chemical inertness with respect to the monomer. This inlet tube 76 is connected by means of fitting 78 having $\frac{1}{8}$ inch knurled nylon thumb screws 80 to 1/16 inch outer diameter tube 82.

These tubes in turn are attached to 1/16 inch plastic ferrule 81 by means of 1/16 inch nylon knurled thumb screws 84. Ferrules 81 are connected to nozzles 72 which provide the dose of monomer to cavities 74 (not shown, see FIG. 1).

The dosing nozzle 72 has its exit surface 86 cut at an angle of 45°±15°. The nozzle is placed 0.50 mm±0.2 mm above the cavity being dosed.

The performance of the system is shown in the tables below.

TABLE 1

| VACUUM (TORR) | MONOMER RATE = 18.6 ml/min | |
|---|---|---|
| | OXYGEN CONCENTRATION (PPM) | TEMPERATURE (°C.) |
| 760 | 17.6 | 22.9 |
| 4 | 2.5 | 22.2 |

TABLE 2

| VACUUM (TORR) | MONOMER RATE = 8.5 ml/min | |
|---|---|---|
| | OXYGEN CONCENTRATION (PPM) | TEMPERATURE (°C.) |
| 760 | 17.4 | 22.5 |
| 4 | 0.58 | 22.4 |

The length of silicon tubing to process the above flow of monomer is a total of 60 meters. Without the static mixtures, it has been calculated that approximately 2 to 3 kilometers of tubing would be required.

In operation, the unit is supplied with the monomer in 15 liter containers and operated as described above and depicted in FIGS. 1 and 2. The method preferably includes the step of maintaining an inert gas environment around the monomer removed from the gas permeable tube until the monomer is polymerized into an ophthalmic lens. This is done by having the monomer travel through gas impermeable lines and reservoirs containing no gas, or by maintaining an inert gas environment about the degassed monomer. Further to FIGS. 1 and 2, the monomer processed and delivered to manifold 38 is pumped by precision dose pumps 40. These pumps and controllers 41 are IVEK pumps made by the Motor and Control Division of Pacific Science, Rockford, Ill. These pumps supply nozzles 72 which then deposit precision doses of degassed monomer in mold cavities 74.

These mold cavities are then mated with the opposing mold portion to form a cavity containing the degassed monomer and forming the shape of the lens. Polymerization is then initiated by exposure to UV light and the mold halves are then separated and the ophthalmic lens is removed. Ways by which the lens may be removed from the mold are known in the art and depend upon the molding process and materials used. One example in which lens removal is accomplished is found in U.S. Pat. Nos. 5,094,609 and 5,080,839, both to Kindt-Larsen.

The above described preferred process utilizes a mold casting method but may alternately employ a spin cast process where only one portion of a mold is dosed with the appropriate amount of degassed monomer. Rotated at an angular velocity to cause the unclosed surface of the monomer to take on the desired shape, polymerization is then initiated by ultraviolet light or heat.

The above description sets forth by example only, the invention which is defined in its broadest sense by the claims that follow.

We claim:

1. A method of making an ophthalmic lens comprising the steps of:
    supplying a monomer to a receiving means,
    pumping said monomer from said receiving means into a gas permeable tube via one end of the tube and along the interior length of the tube,
    drawing and maintaining a subatmospheric pressure about the exterior of said tube to degas the monomer within the gas permeable tube to degas the monomer within the gas permeable tube,
    removing said monomer from the other end of said tube,
    placing said monomer into a mold and causing the monomer to assume the shape of an ophthalmic lens,
    polymerizing said monomer into a polymer ophthalmic lens, and
    removing said polymerized ophthalmic lens from the mold.

2. The method of claim 1 further comprising the step of inducing mixing of the monomer within said tube.

3. The method of claim 1 further comprising the step of returning an amount of monomer removed from said tube which is in excess of that required for said mold to said receiving means.

4. The method of claim 1 further comprising the step of maintaining an inert environment for said monomer removed from said gas permeable tube until said monomer is polymerized into a lens.

5. The method of claim 1 wherein said pumping of monomer is into a silicone rubber tube.

6. An apparatus for fabricating an ophthalmic lens comprising:
    means for supplying a monomer,
    a gas permeable tube connected at one end to said means for supplying the monomer so as to supply the monomer to the interior of said tube,
    a chamber about said gas permeable tube,
    means for drawing and maintaining a subatmospheric pressure, said subatmospheric pressure means connected to said chamber to thereby degas the monomer within the gas permeable tube, and
    means for removing and transferring the monomer from the other end of said tube to a lens mold to fabricate said lens.

7. The apparatus of claim 6 further comprising means for inducing monomer mixing within said tube.

8. The apparatus of claim 7 wherein said means for inducing mixing is a static mixer.

9. The apparatus of claim 6 further comprising means for returning the amount of monomer removed from the other end of said tube that is in excess of that required for said mold cavity to said receiving means.

10. The apparatus of claim 6 wherein said gas permeable tube is comprised of silicone rubber.

* * * * *

UNITED STATES PATENT AND TRADEMARK OFFICE
CERTIFICATE OF CORRECTION

PATENT NO. : 5,435,943
DATED : July 25, 1995
INVENTOR(S) : Adams et al.

It is certified that error appears in the above-identified patent and that said Letters Patent is hereby corrected as shown below:

In the Claims:
Column 7,
Claim 1, lines 13 and 14, delete "to degas the monomer within the gas permeable tube"

Column 8,
Claim 9, line 28, delete "cavity"

Signed and Sealed this

Thirtieth Day of April, 1996

Attest:

BRUCE LEHMAN

*Attesting Officer*  *Commissioner of Patents and Trademarks*